(12) United States Patent
Monk et al.

(10) Patent No.: US 12,064,890 B2
(45) Date of Patent: Aug. 20, 2024

(54) WATER BEARING AND FOOD CUTTING ASSEMBLY WITH MAGNETICALLY ROTATED CUTTING HEAD

(71) Applicant: Lamb Weston, Inc., Eagle, ID (US)

(72) Inventors: Samuel Monk, Richland, WA (US); Tayler Wonders, Kennewick, WA (US); Grayden Howard, Richland, WA (US); Mark Fow, Kennewick, WA (US)

(73) Assignee: Lamb Weston, Inc., Eagle, ID (US)

( * ) Notice: Subject to any disclaimer, the term of this patent is extended or adjusted under 35 U.S.C. 154(b) by 295 days.

(21) Appl. No.: 17/174,428

(22) Filed: Feb. 12, 2021

(65) Prior Publication Data

US 2021/0245386 A1    Aug. 12, 2021

Related U.S. Application Data

(60) Provisional application No. 62/975,279, filed on Feb. 12, 2020.

(51) Int. Cl.
*B26D 3/22* (2006.01)
*B26D 5/08* (2006.01)
*F16C 17/02* (2006.01)

(52) U.S. Cl.
CPC ............. *B26D 3/22* (2013.01); *B26D 5/08* (2013.01); *F16C 17/026* (2013.01)

(58) Field of Classification Search
CPC ...... B26D 7/0658; B26D 7/2614; B26D 3/11; B26D 3/22; Y10S 83/932; Y10T 83/6472;
(Continued)

(56) References Cited

U.S. PATENT DOCUMENTS 3,610,713 A   10/1971   Satterthwaite et al.
4,082,024 A    4/1978   Hodges
(Continued)

FOREIGN PATENT DOCUMENTS

CH         657254 A5    8/1986
CN      102630899 A     8/2012
(Continued)

OTHER PUBLICATIONS

Notification of Transmittal of the International Search Report and the Written Opinion of the International Searching Authority, or the Declaration dated Jun. 3, 2021 for PCT/US2021/017762.
(Continued)

*Primary Examiner* — Jennifer S Matthews
(74) *Attorney, Agent, or Firm* — TraskBritt

(57) ABSTRACT

A food cutter assembly can include a spindle body defining an interior passage for receiving a food product. A cutting tool can be connected to an end of the spindle body for cutting the food product. The food cutter assembly can also include a housing for rotationally mounting the spindle body. Rotation of the spindle body can be controlled by one or more magnets mounted to the spindle body and by a stator and/or pulley magnetically or electromagnetically coupled with the magnet to drive the one or more magnets about a rotational axis, which in turn spins the spindle body about the rotational axis, driving the rotational cutting motion of the cutting tool.

20 Claims, 9 Drawing Sheets

(58) Field of Classification Search
CPC ...... Y10T 83/2066; F16C 17/10; F16C 17/14; F16C 17/26; F16C 33/1045
See application file for complete search history.

(56) References Cited

U.S. PATENT DOCUMENTS

| | | | |
|---|---|---|---|
| 4,083,612 A | 4/1978 | Olson | |
| 4,607,964 A | 8/1986 | Kramer et al. | |
| 4,644,838 A | 2/1987 | Samson et al. | |
| 4,884,899 A | 12/1989 | Schwartzman | |
| 5,168,784 A | 12/1992 | Foster et al. | |
| 5,174,181 A | 12/1992 | Julian et al. | |
| 5,179,881 A | 1/1993 | Frey et al. | |
| 5,191,823 A | 3/1993 | Miller et al. | |
| 5,323,076 A | 6/1994 | Hajec | |
| 5,343,791 A | 9/1994 | Julian et al. | |
| 5,394,793 A | 3/1995 | Julian et al. | |
| 5,421,226 A | 6/1995 | Mendenhall | |
| 5,568,755 A | 10/1996 | Mendenhall | |
| 6,053,705 A | 4/2000 | Schob et al. | |
| 6,413,566 B2 | 7/2002 | Caridis et al. | |
| 6,457,393 B1 | 10/2002 | Englar | |
| 6,505,972 B1 | 1/2003 | Harbottle et al. | |
| 7,000,518 B2 | 2/2006 | Bucks et al. | |
| 7,052,213 B2 | 5/2006 | Mendenhall | |
| RE39,838 E | 9/2007 | McDearmon | |
| 8,115,356 B2 | 2/2012 | Bauer | |
| 9,032,892 B2 | 5/2015 | Colquhoun | |
| 9,227,336 B2 | 1/2016 | Hebbeln | |
| 9,742,256 B2 * | 8/2017 | Masuzawa | H02K 1/185 |
| 10,363,679 B2 | 7/2019 | Julian et al. | |
| 10,384,364 B2 | 8/2019 | Julian et al. | |
| 11,399,460 B1 * | 8/2022 | Baiocchi | H02K 49/106 |
| 2006/0119197 A1 | 6/2006 | Puterbaugh et al. | |
| 2010/0295423 A1 * | 11/2010 | Hsiao | H02K 7/1016 310/75 R |
| 2011/0234145 A1 * | 9/2011 | Langreck | H02K 1/148 318/720 |
| 2012/0024125 A1 | 2/2012 | Walker et al. | |
| 2014/0066214 A1 | 3/2014 | Flanigan | |
| 2014/0356123 A1 | 12/2014 | Gerber et al. | |
| 2015/0292555 A1 | 10/2015 | Quappen | |
| 2018/0100564 A1 * | 4/2018 | Fliearman | F16H 3/54 |
| 2018/0222075 A1 | 8/2018 | Julian et al. | |
| 2022/0263385 A1 * | 8/2022 | Shiraki | H02K 5/203 |

FOREIGN PATENT DOCUMENTS

| | | | | |
|---|---|---|---|---|
| CN | 104825073 A | | 8/2015 | |
| JP | 2016023722 A | * | 2/2016 | |
| JP | 2016023722 A | | 2/2016 | |
| WO | 1994/006678 | | 3/1994 | |
| WO | 98/11650 A1 | | 3/1998 | |
| WO | 2002/041484 A2 | | 5/2002 | |
| WO | 2004/011837 A1 | | 2/2004 | |
| WO | WO-2009051150 A1 | * | 4/2009 | B23Q 11/04 |
| WO | 2018/148112 A1 | | 8/2018 | |

OTHER PUBLICATIONS

United Kingdom Patent Examination Report for United Kingdom Patent Application No. GB2211740.2 , dated May 25, 2023, 5 pages.
European Extended Search Report and Opinion for European Application No. 21753173.0, dated Feb. 9, 2024, 11 pages.
United Kingdom Patent Examination Report for United Kingdom Patent Application No. GB2211740.2 , dated Jan. 5, 2024, 5 pages.

* cited by examiner

WATER BEARING AND FOOD CUTTING ASSEMBLY WITH MAGNETICALLY ROTATED CUTTING HEAD

CROSS-REFERENCE TO RELATED APPLICATIONS

The present application claims the benefit under 35 U.S.C. § 119(e) of U.S. Provisional Application Ser. No. 62/975,279, entitled WATER BEARING AND FOOD CUTTING ASSEMBLY WITH MAGNETICALLY ROTATED CUTTING HEAD, filed Feb. 12, 2020. U.S. Provisional Application Ser. No. 62/975,279 is hereby incorporated by reference in its entirety.

BACKGROUND

An increasing number of food products are processed before arriving on a consumer's plate. A variety of fruits and vegetables, for example, are cut or shaped and then frozen or otherwise preserved for later use. In order to meet the demand for processed food products and efficiently produce large quantities of such products, the food industry utilizes various equipment for rapidly processing large amounts of foodstuff.

BRIEF SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner.

Aspects of the disclosure can relate to a food cutter assembly. A food cutter assembly can include a spindle body defining an interior passage for receiving a food product. A cutting tool can be connected to an end of the spindle body for cutting the food product. The food cutter assembly can also include a housing for rotationally mounting the spindle body. Rotation of the spindle body can be controlled by one or more magnets mounted to the spindle body and by a stator and/or pulley magnetically or electromagnetically coupled with the magnet to drive the one or more magnets about a rotational axis, which in turn spins the spindle body about the rotational axis, driving the rotational cutting motion of the cutting tool.

BRIEF DESCRIPTION OF THE DRAWINGS

The Detailed Description is described with reference to the accompanying figures.

DETAILED DESCRIPTION

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. Among other things, the features of the disclosure can be embodied as formulations, food products, processes, processes for making food products, and processes for making formulations. The following detailed description is, therefore, not to be taken in a limiting sense.

Equipment for processing foodstuff can include bearings or other moving components. The bearings or other moving components can be lubricated by an oil or gel. In some instances, a portion of the oil or gel used to lubricate can seep into the food product flow stream, possibly contaminating the food product. Additionally, the lubricant can heat up due to the relative motion of the components and can deteriorate over time. This can result in interruptions where the system needs to cool down or where the lubricant needs to be flushed from the system and changed. Mechanical sealing systems can be utilized to prevent seepage of lubricant into areas of the foodstuff processing equipment outside of lubricant channels or to areas external to the foodstuff processing equipment (e.g., where mechanical motors are used to drive internal rotors). Such systems can be employed where external motors use belts or other linkages to rotor sprockets mounted to internal rotors. The mechanical seals used by such systems can reduce in effectiveness over time, requiring system downtime to prevent leaks or repair broken seals. Further, the mechanical seals and external mechanically-linked motors can pose additional assembly challenges to reach internal mechanical seals for proper installation.

Figure 1:
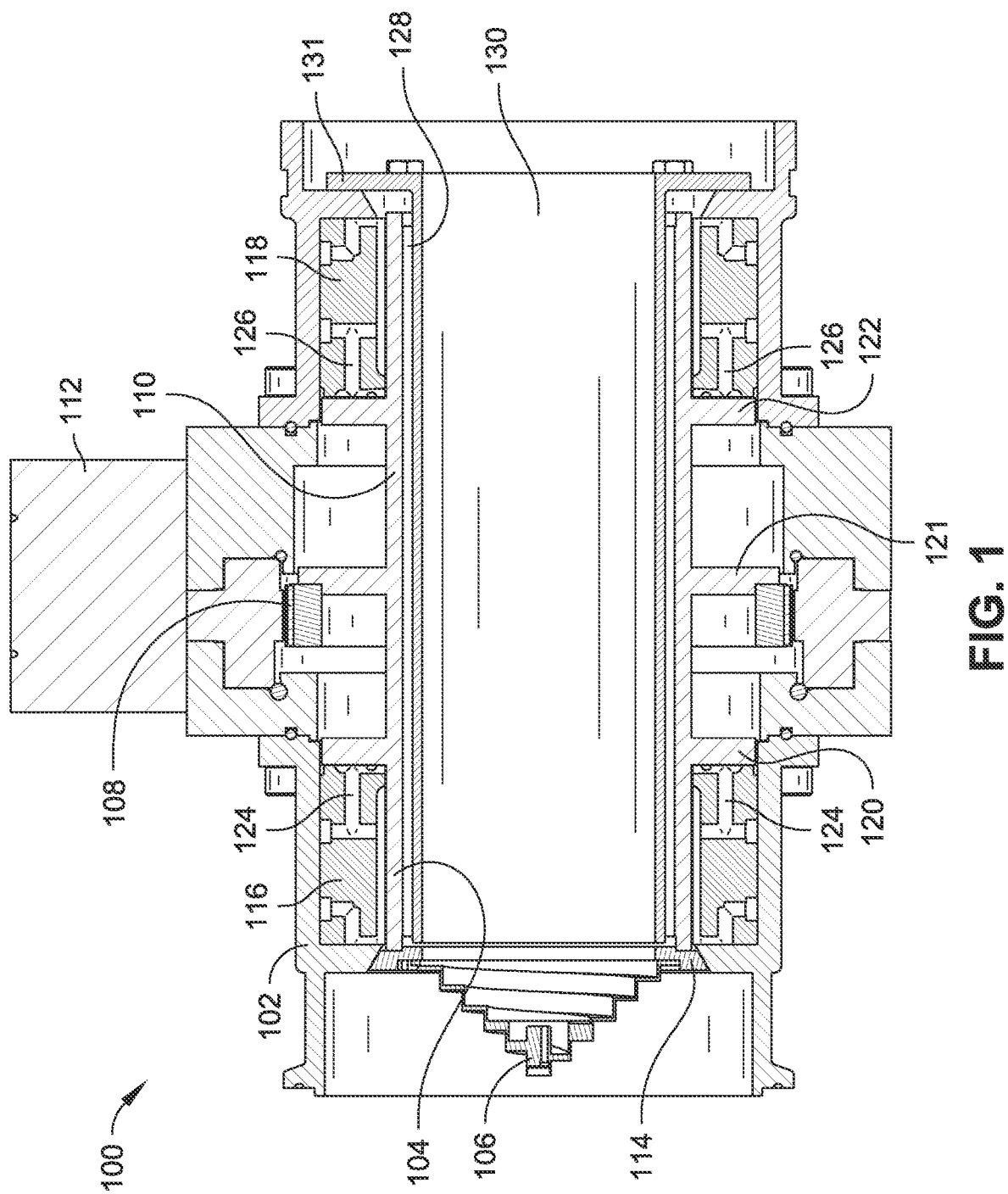
FIG. 1 is a cross-sectional view illustrating a food cutter assembly including a housing with radial bearings for rotationally mounting a spindle body, the spindle body having thrust discs and a cutting tool connected to an end of the spindle body, and one or more magnets fixedly connected to the spindle body to be driven by an electric motor, where a water film can be created between the housing and the spindle body to reduce friction between the housing and the spindle body without internal mechanical seals in accordance with an example embodiment of the present disclosure.
Figure 2A:
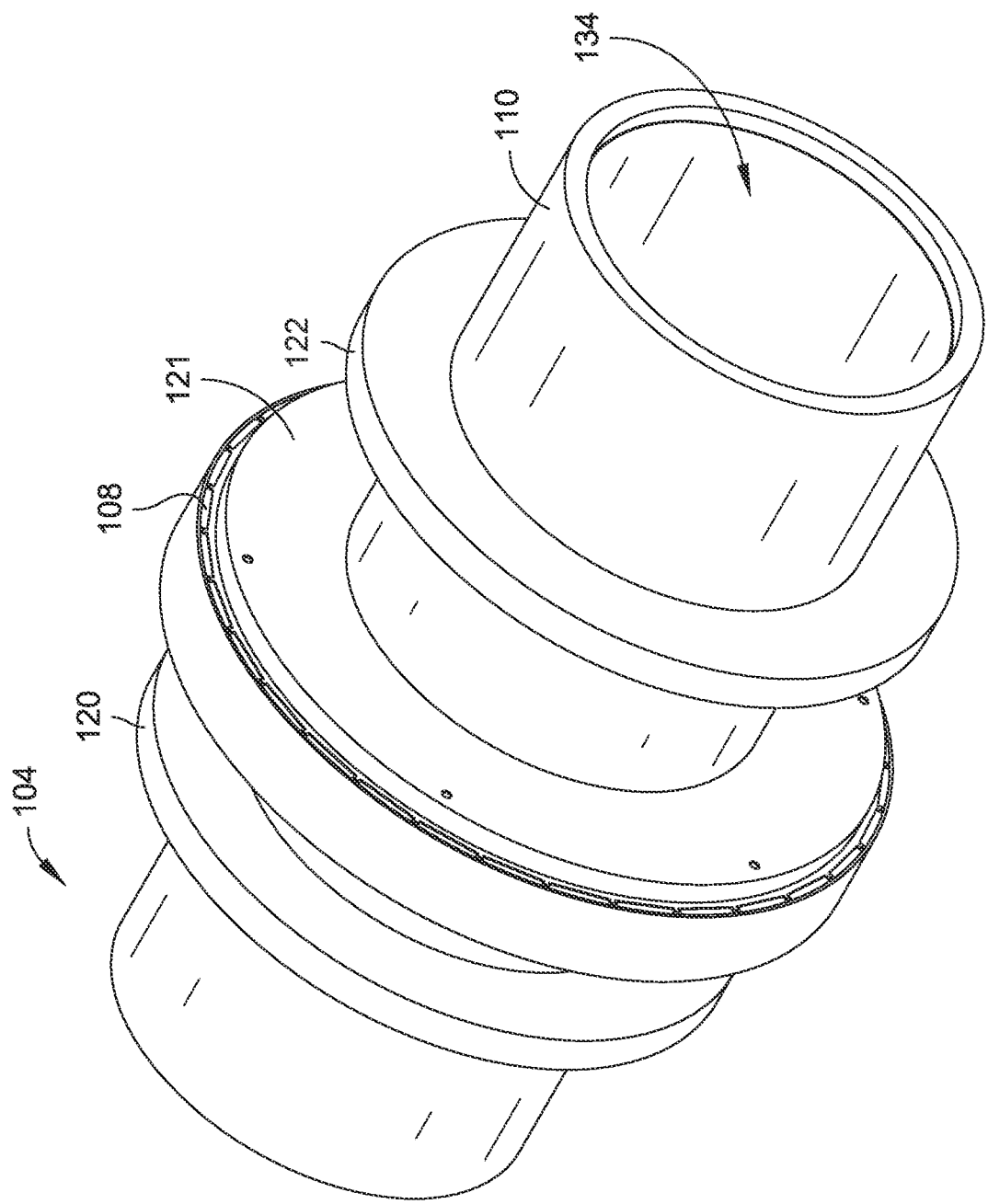
FIG. 2A is an isometric view of the spindle body of the food cutter assembly illustrated in FIG. 1, with a plurality of magnets connected to the spindle body.
Figure 2B:
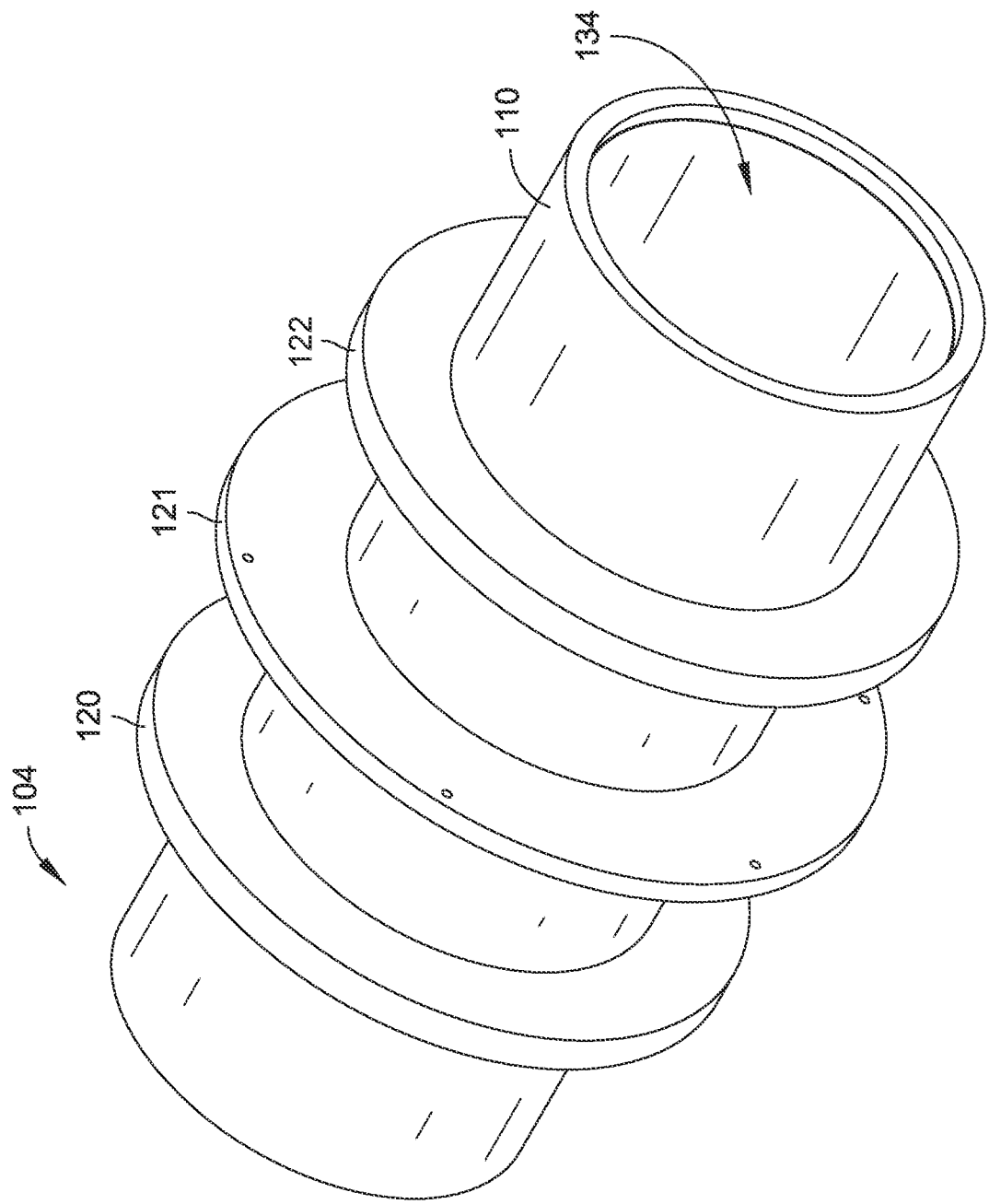
FIG. 2B is an isometric view of the spindle body of the food cutter assembly illustrated in FIG. 1, without any magnets connected.

FIGS. 1 through 8 illustrate a food cutter assembly 100 in accordance with embodiments of this disclosure. The features associated with the food cutter assembly 100 eliminate the risk of contaminating the assembly, reduce down time for operating the food cutter assembly, eliminate the risk of internal mechanical seal failure, and reduce installation challenges dependent on external mechanically-linked motors. In FIG. 1, the food cutter assembly 100 is shown to include a housing 102 for a spindle 104 having a cutting tool 106 coupled to an end of the spindle 104 for processing food product supplied to the food cutter assembly 100 by a food product processing path (e.g., in an axial direction shown in FIG. 3). The food product to be introduced to the food cutter assembly 100 can include, but is not limited to, all types of potatoes, sweet potatoes, yams, apples, pears, carrots and other types of fruits and vegetables with similar flesh density. In some situations, the food product can be a frozen and/or chilled food product to provide a suitable hardness for cutting by the cutting tool 106. The spindle 104 includes one or more magnets 108 mounted to a rotor body 110 (e.g., shown in FIGS. 2A and 2B) rotatable in the housing 102 through action of an electric motor stator 112 mounted to the housing 102. In some embodiments, the stator 112 is controlled by a variable frequency drive (VFD) to control rotation of the magnets 108 and rotor body 110, which in turn rotates the cutting tool 106. For example, the cutting tool 106 can be mounted to an end of the rotor body 110 via a mounting disc 114. In some embodiments, the cutting tool 106 can include a helical knife having one or more helical or spiral shaped blades for shaping the food product into cut food product segments e.g., spiral cut shapes and other shapes). Alternatively or additionally, the cutting tool 106 may include a pulverizer or any other rotationally driven food processing element.

In embodiments, the food cutter assembly 100 may include one or more radial bearings (e.g., a first radial bearing 116 and a second radial bearing 118) for rotationally mounting the rotor body 110 of the spindle 104 within the housing 102. The rotor body 110 may be fixedly connected with one or more thrust discs (e.g., a first thrust disc 120 and a second thrust disc 122) that reduce or eliminate contact between the rotor body 110 and the housing 102. For example, the one or more thrust discs may be connected to the rotor body 110 by an interference fit, where the one or more discs are heated and the spindle is cooled while the components are fit together so that they tighten up as they return to their previous temperatures. In some embodiments, the thrust discs may be formed of stainless steel.

The first radial bearing 116 can be positioned proximate to the first thrust disc 120, and the second radial bearing 118 can be positioned proximate to the second thrust disc 122 when the rotor body 110 is rotationally mounted to the housing 102. In some embodiments, the first radial bearing 116 and the second radial bearing 118 are formed of a food grade plastic (e.g., Nylon 6, high density polyethylene, polyethylene terephthalate (PET), or the like). The first radial bearing 116, the second radial bearing 118, the rotor body 110, and the housing 102 can define one or more fluid passages in between components of the food cutter assembly 100 that move relative to one another to receive fluid (e.g., for lubrication). For example, the rotor body 110 and the housing 102 can define first fluid passages 124 extending from a first port in the housing 102 (not shown) through the first radial bearing 116 to the rotor body 110. The rotor body 110 and the housing 102 can also define second fluid passages 126 extending from a second port in the housing 102 (not shown) through the second radial bearing 118 to the rotor body 110 and to a gap 128 between the rotor body 110 and a stationary tube 130 coupled to the housing 102. In some embodiments, the tube 130 extends into an interior of the rotor body 110 terminating adjacent the mounting disc 114 (e.g., as shown in FIG. 1) and mounts to an opposing end of the housing 102 via a flange or other connection. The first radial bearing 116, the second radial bearing 118, the rotor body 110, and the housing 102 can define additional fluid passages to facilitate lubrication between components of the food cutter assembly 100 that move relative to one another without internal mechanical seals present.

Figure 3:
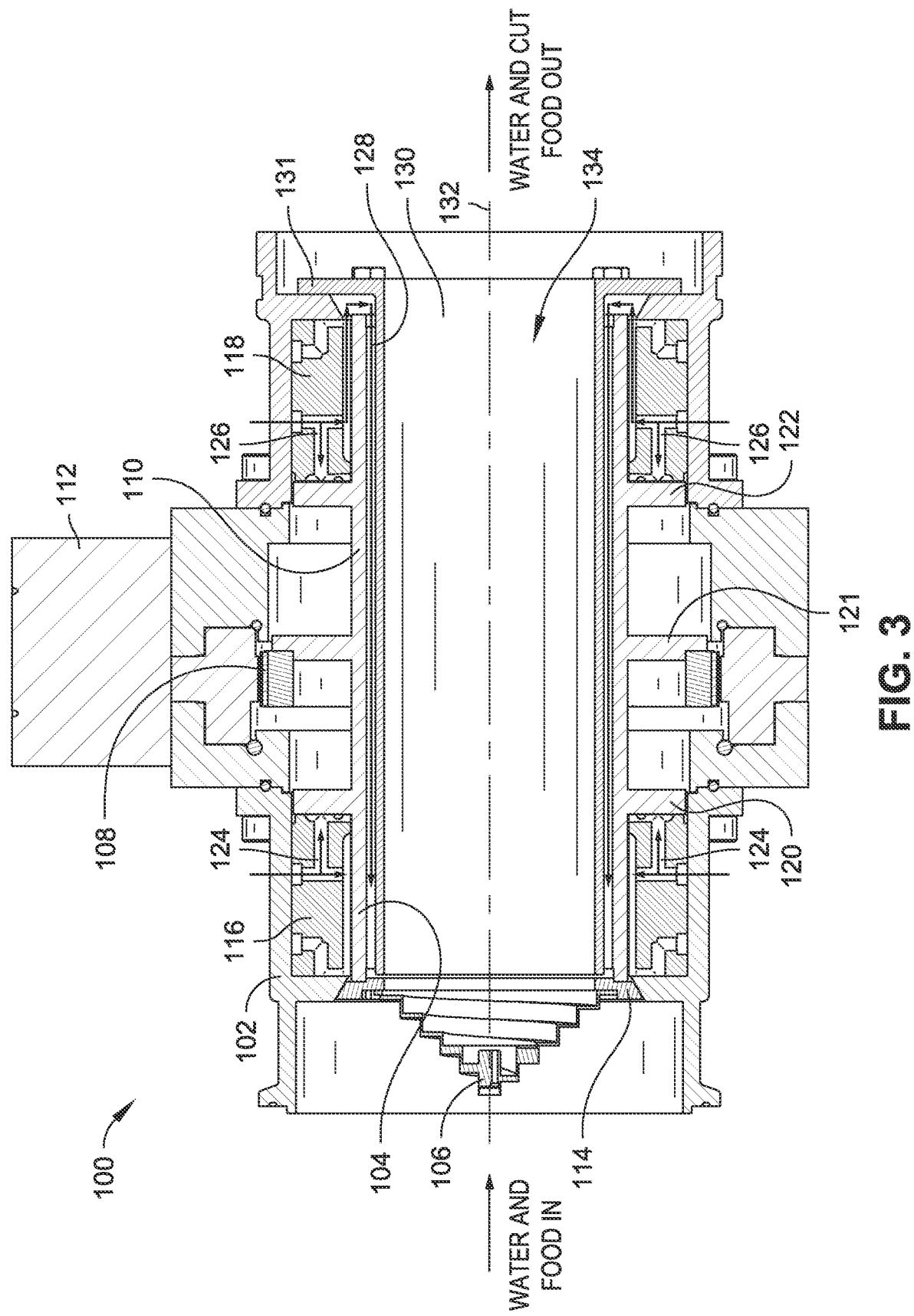
FIG. 3 is a cross-sectional view of the food cutter assembly illustrated in FIG. 1, shown with fluid flow paths through the housing.

Although, first and second bearings and first and second thrust discs are shown in FIGS. 1 and 3, in other embodiments, the food cutter assembly 100 may include a single bearing or thrust disc, or more than two bearings or thrust discs. In the illustrated embodiments, first and second bearings and first and second thrust discs are arranged on either side of the rotor magnets 108. This configuration may facilitate structural balance for the spindle 104 and allow the spindle 104 to rotate smoothly within the housing 102 when the rotor magnets 108 are driven by the stator 112. In embodiments, the rotor magnets 108 are coupled to a mounting disc 121 extending radially from the rotor body 110 between the first thrust disc 120 and the second thrust disc 122. Alternatively or additionally, the rotor magnets 108 can be coupled to the rotor body 110 at different locations, including, but not limited to, an exterior surface of the rotor body 110, embedded within a portion of the rotor body 110 (e.g., embedded within a portion of one or more of the first thrust disc 120, the mounting disc 121, the second thrust disc 122, etc.), and combinations thereof.

In embodiments, the food cutter assembly 100 can include an externally-driven mount to provide rotation of the spindle 104 through magnetic interaction between the externally-driven mount and the spindle 104 to rotate the cutting tool 106 in addition to or as an alternative to operation of the stator 112. For example, referring generally to FIGS. 4-8, the food cutter assembly 100 is shown with a pulley mount 400 configured to be rotated about the rotor body 110 by an external motor (e.g., via a belt). The pulley mount 400 is coupled to the housing 102 and includes a stationary shaft 402 about which one or more magnets 404 are rotated through operation of the external motor and belt to drive the spindle 104 via magnetic coupling of the magnets 404 with the magnets 108 mounted to the rotor body 110. The pulley mount 400 can include a sprocket 406 formed around a pulley 408 to be driven by the belt. Alternatively or additionally, the pulley mount 400 can include a different surface feature to engage with the belt driven by the external motor. In embodiments, the pulley mount 400 provides a pressure seal for the food cutter assembly 100 to maintain fluids within the food cutter assembly 100 while providing rotation of the spindle 104 via an external motor outside of the pressure seal provided by the pulley mount 400. For example, the stationary shaft 402 can be constructed from a substantially non-magnetic material, including but not limited to stainless steel, to permit magnetic coupling between the magnets 404 and the magnets 108.

Figure 4:
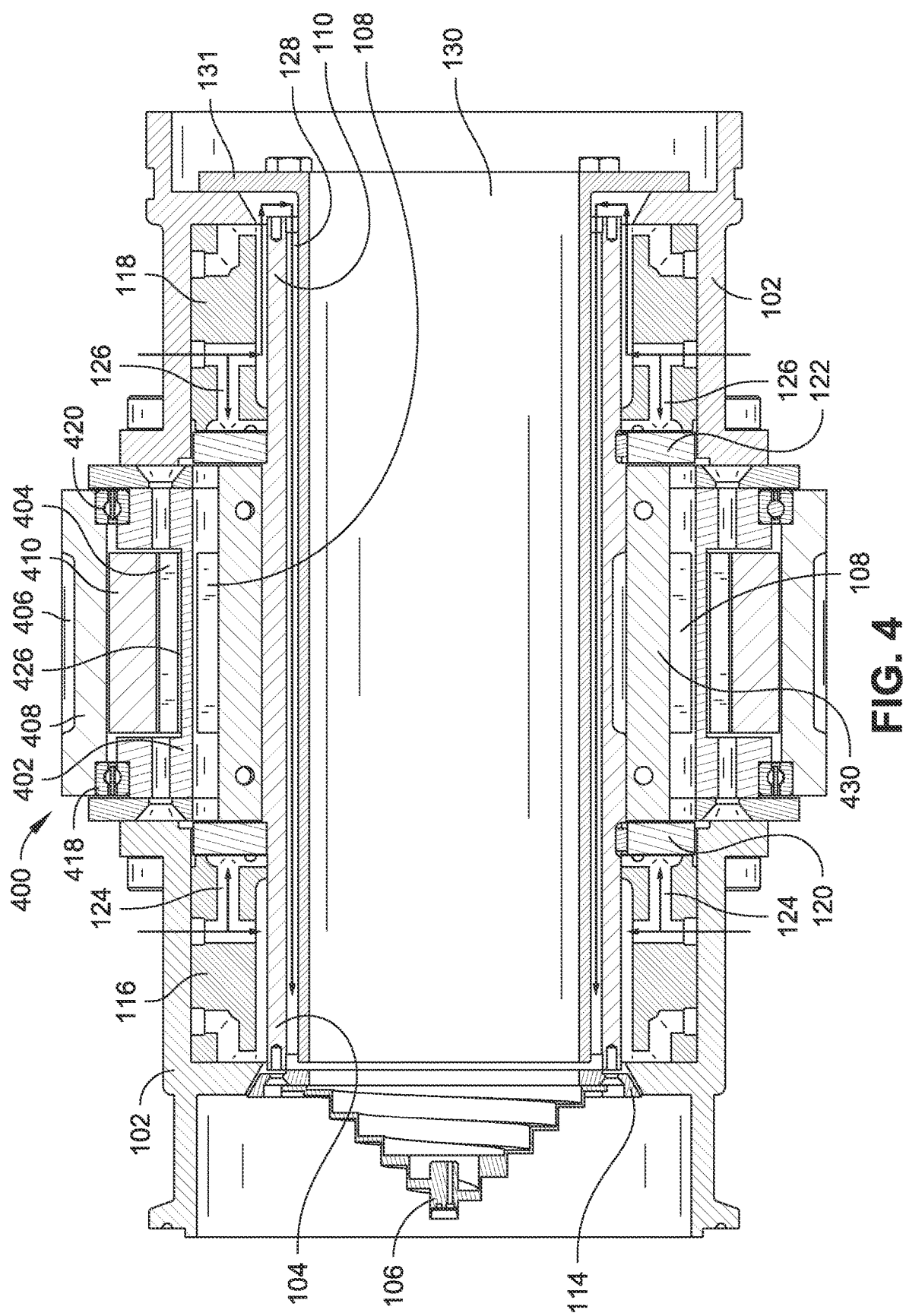
FIG. 4 is a cross-sectional view illustrating a food cutter assembly including a housing with radial bearings for rotationally mounting a spindle body, the spindle body having thrust discs and a cutting tool connected to an end of the spindle body, and one or more magnets fixedly connected to the spindle body to be driven by an external pulley mount having corresponding magnets rotatable about a stationary shaft positioned between magnets of the spindle and magnets of the pulley, where a water film can be created between the housing and the spindle body to reduce friction between the housing and the spindle body without internal mechanical seals in accordance with an example embodiment of the present disclosure.
Figure 5:
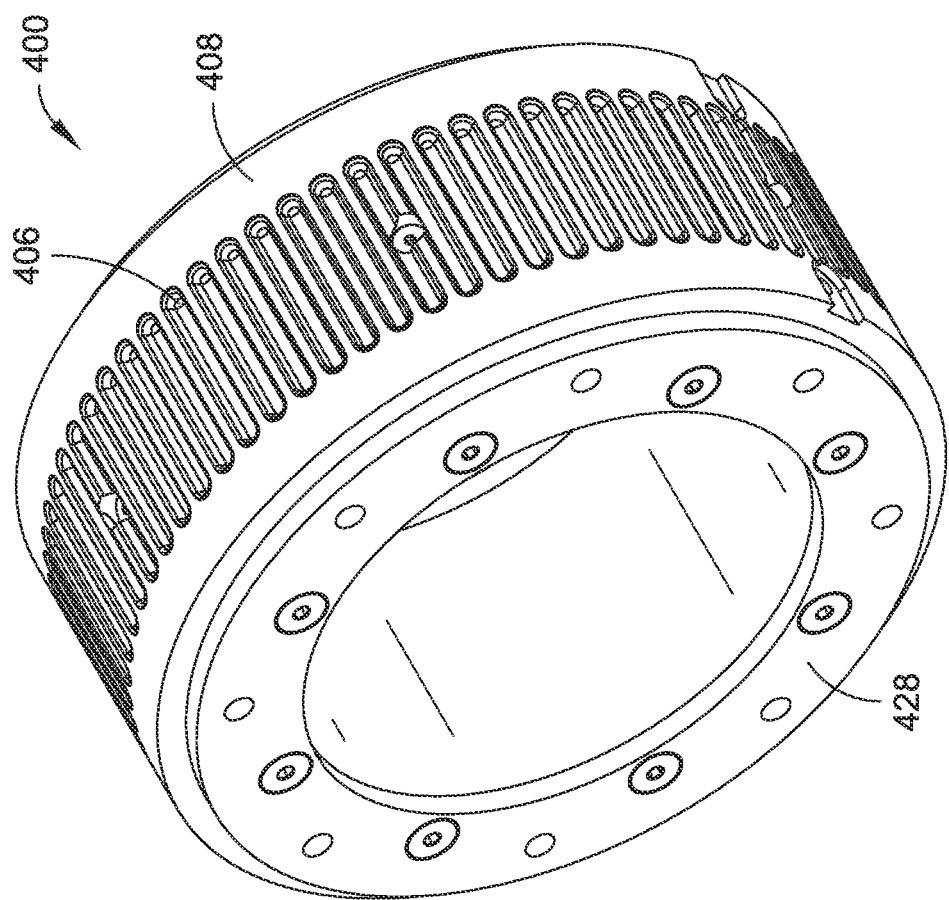
FIG. 5 is an isometric view of the external pulley mount of the food cutter assembly illustrated in FIG. 4.
Figure 6:
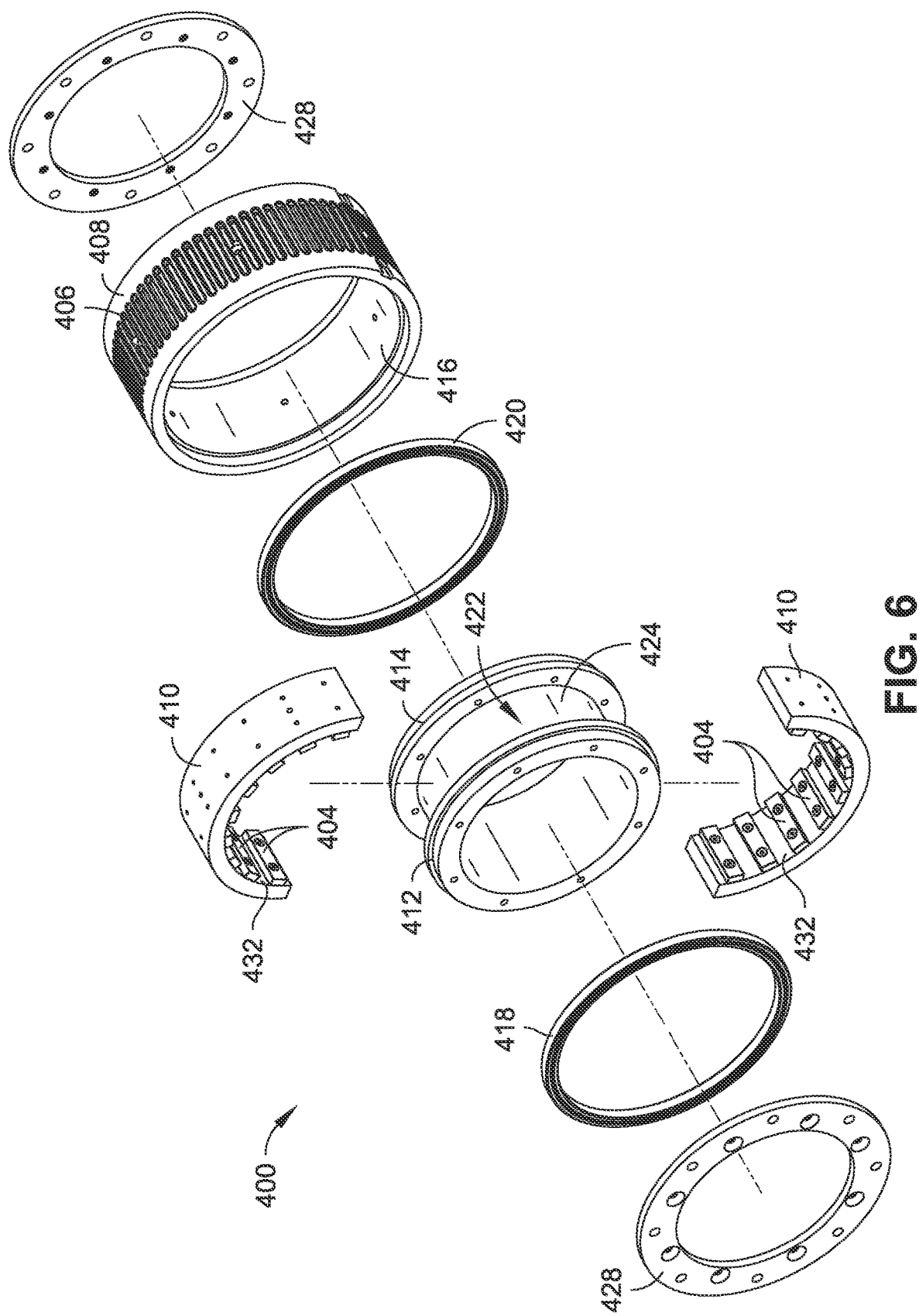
FIG. 6 is an exploded view of the external pulley mount illustrated in FIG. 5.

The magnets 404 can be secured to a collar 410 (e.g., via pins, bolts, or other fasteners) that surrounds at least a portion of the stationary shaft 402. For example, FIG. 6 shows the collar 410 configured to surround the stationary shaft 402 between a first flange 412 and a second flange 414 of the stationary shaft 402 with the magnets 404 secured to an interior surface 432 of the collar 410. The collar 410 can be secured against an interior surface 416 of the pulley 408 (e.g., via friction fit, via fastener, or the like) to rotatably position the magnets 404 about the stationary shaft 402 when the pulley 408 is mounted about the stationary shaft 402. For example, the stationary shaft 402 can fit within an internal area defined by the interior surface 416 of the pulley 408. The stationary shaft 402 is secured to the housing 102 to maintain the stationary shaft 402 in a fixed position (e.g., non-rotatable) relative to the food product processing path and to provide a pressure seal for the food cutter assembly 100 to maintain fluids within the housing 102. The pulley 408 rotates about the stationary shaft 402 via one or more bearings secured between the stationary shaft 402 and the pulley 408. For example, FIGS. 4 and 6 show a first bearing 418 and a second bearing 420 positioned between the stationary shaft 402 and the interior surface 416 of the pulley 408 to facilitate rotation of the pulley 408 with the collar 410 and associated magnets 404 about the stationary shaft 402. While the first bearing 418 is shown abutting the first flange 412 and the second bearing 420 is shown abutting the second flange 414, the pulley mount 400 is not limited to such bearing arrangements and can include fewer than two bearings or greater than two bearings in other positions to support the pulley 408 relative to the stationary shaft 402.

In embodiments, the magnets 404 secured to the collar 410 are maintained in a groove 422 formed on the stationary shaft 402 between the first flange 412 and the second flange 414. The magnets 404 can be separated from an upper surface 424 of the groove 422 by a gap 426 to prevent contact between the magnets 404 and the stationary shaft 402 during rotation of the magnets 404 when driven by the external motor. For example, the first bearing 418 and the second bearing 420 can support the pulley 408 relative to the stationary shaft 402 with the collar 410 secured to the pulley 408 to introduce the magnets 404 within the groove 422 and to provide the gap 426 between the magnets 404 and the upper surface 424 of the groove 422. The pulley mount 400 can include mounting plates 428 to secure the pulley 408 relative to the stationary shaft 402 and to provide coupling between the pulley mount 400 and the housing 102 of the food cutter assembly 100.

As the pulley 408 is rotated, the collar 410 and associated magnets 404 are correspondingly rotated about the stationary shaft 402. In embodiments, the stationary shaft 402 separates the magnets 404 of the pulley mount 400 from the magnets 108 associated with the spindle 104, but permits magnetic interaction between the magnets 404 of the pulley mount 400 and the magnets 108 of the spindle 104 through the material of the stationary shaft 402 between the respective magnets via magnetic coupling. For example, as the pulley 408 is driven to rotate about the stationary shaft 402, the magnets 404 rotate and impose magnetic forces through the stationary shaft 402 against the magnets 108, resulting in rotation of the spindle 104 and the cutting tool 106. The stationary shaft 402 generally includes a thickness of material between the magnets 404 and the magnets 108 suitable to permit magnetic coupling while also providing structural support for the food cutter assembly 100 while operating the cutting tool 106 at rotation speeds exceeding 1000 rpm. In embodiments, the stationary shaft 402 can include a thickness of material between the magnets 404 and the magnets 108 from approximately one-sixteenth to three quarters an inch (0.0625 to 0.75 in.), for example, the stationary shaft 402 can include a thickness of material between the magnets 404 and the magnets 108 of approximately one-eighth an inch (0.125 in.). In embodiments, the magnets 108 are mounted to a collar 430 (e.g., via a fastener), which in turn is secured to the rotor body 110 of the spindle 104 (e.g., via friction fit, via fastener, etc.). Alternatively or additionally, the magnets 108 can be mounted directly to the rotor body 110.

Figure 7:
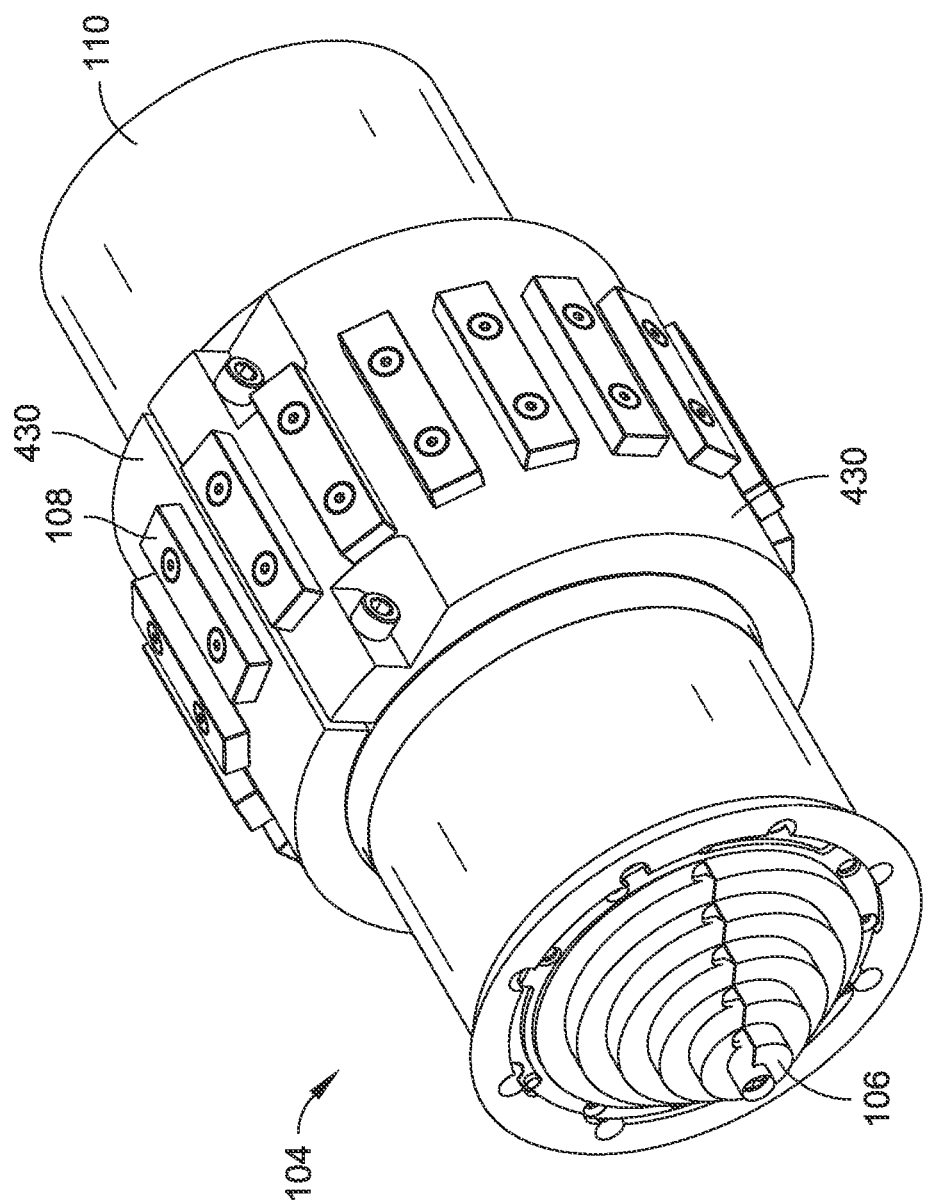
FIG. 7 is an isometric view of the spindle body illustrated in FIG. 4, having a cutting tool connected to an end of the spindle body and having a collar coupled to an exterior surface of the spindle body with a plurality of magnets mounted to the collar.
Figure 8:
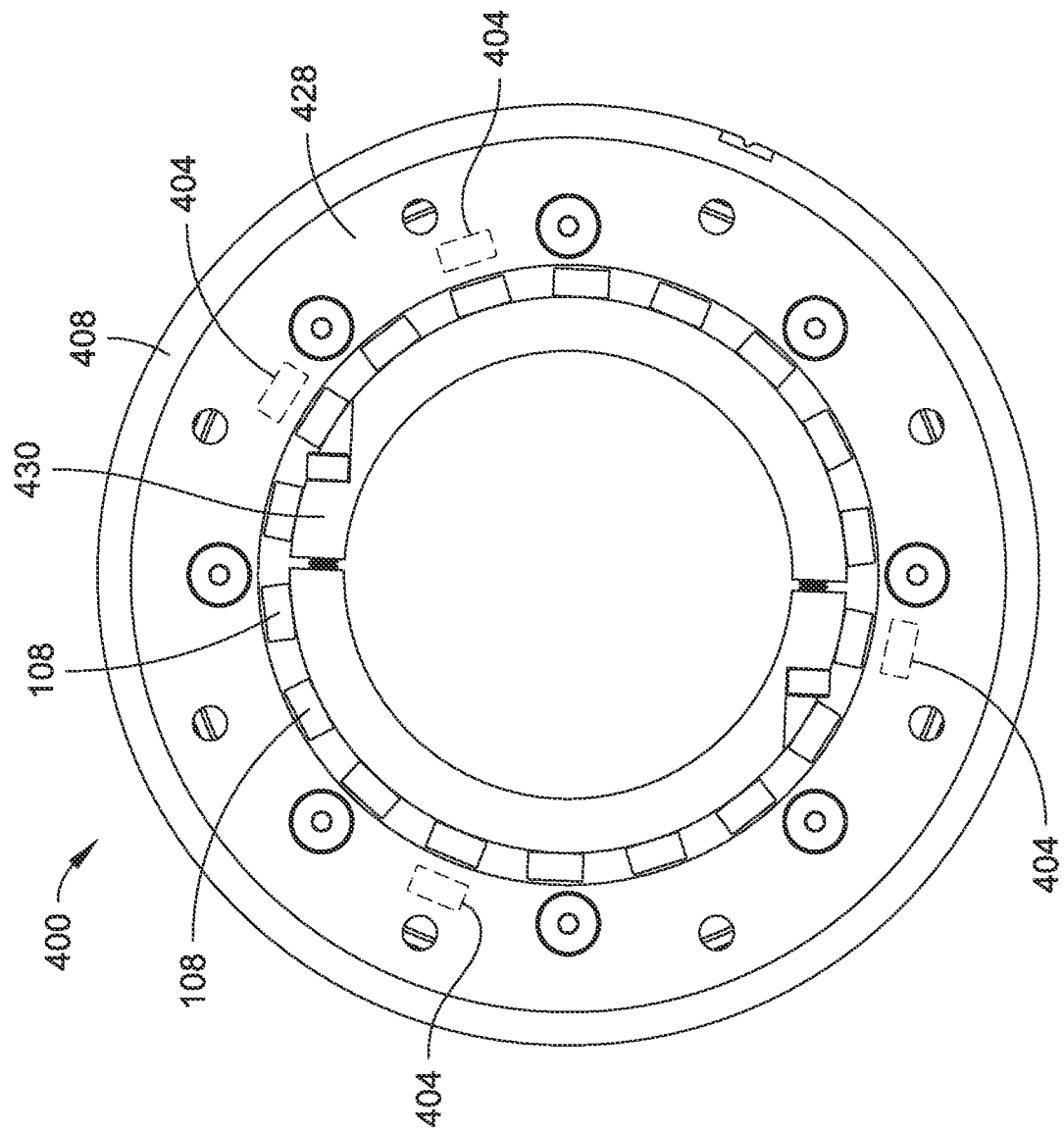
FIG. 8 is a side view of the collar illustrated in FIG. 7 positioned within an interior region of the external pulley mount of the food cutter assembly illustrated in FIG. 4.

The magnets 108 and the magnets 404 can be substantially the same shape and size relative to each other and are arranged with magnetic poles from the magnets 108 facing opposing magnetic poles from the magnets 404. In embodiments, the magnets 108 and the magnets 404 have a width along the surfaces of the respective collars 430 and 410 that is greater than a height of the magnets 108 and the magnets 404, where the height is in a direction tangentially disposed from the outer surfaces of the respective collars 430 and 410 (e.g., as shown in FIGS. 4, 6, and 7). For example, the magnets 404 can have a first magnetic pole (e.g., S) disposed along the width of the magnets 404 that is secured to the interior surface 432 of the collar 410 and can have a second magnetic pole (e.g., N) opposing the first magnetic pole disposed along the width of the magnets 404 that opposes the magnets 108. For example, the magnets 404 can have a first magnetic pole (e.g., S) disposed along the face of the magnets 404 that is secured to the interior surface 432 of the collar 410 and can have a second magnetic pole (e.g., N) opposing the first magnetic pole disposed along the face if the magnets 404 that it exposed to the magnets 108 through the stationary shaft 402.

In operation, the rotor body 110 is rotated within the housing 102 through magnetic/electromagnetic interaction between the stator 112 and the magnets 108 fixedly connected to the rotor body 110 (e.g., as shown in FIGS. 1-3) or through magnetic interaction between externally-driven magnets 404 housed in the pulley mount 400 and the magnets 108 fixedly connected to the rotor body 110 (as shown in FIGS. 4-8), whereby the movement of the rotor body 110 causes the cutting tool 106 to rotate about a rotational axis 132 that is aligned with a processing path of the food product (e.g., as shown in FIG. 3). The rotor body 110 can also define an interior passage 134 extending along the rotational axis 132. The interior passage 134 can receive the cut food product segments from the cutting tool 106. In some embodiments, the tube 130 is located in the interior passage 134 along the length of the rotor body 110 terminating adjacent to the mounting disc 114 for receiving the cut food product segments and transporting the cut food product segments out from the food cutter assembly 100 to another portion of the food product processing path. For example, the tube 130, or another transport structure coupled to the tube 130 (e.g., at the flange), can transport the cut food product segments to another food processing device or station, or to a storage container. The rotor body 110 can rotate around the tube 130, which can be stationary relative to the food product processing path. The tube 130 may be configured to fixedly connect to the housing 102 (e.g., via a flange 131) and extend into the rotor body 110 to receive the cut food product segments from the cutting tool 106. In this regard, the tube 130 may also serve to protect the cut food product segments from being damaged or broken down further by the rotating rotor body 110. In some embodiments, the rotor body 110 and/or the tube 130 can be formed of a food grade plastic material and/or other food grade handling structure.

The stator 112 and/or the pulley 408 remotely interacts with the magnets 108 mounted to the rotor body 110, such as through magnetic or electromagnetic interactions, causing motion of the rotor body 110. The motion of the rotor body 110 correspondingly rotates and spins the cutting tool 106 at the end of the spindle 104. In some embodiments, the stator 112 and/or the pulley 408 are configured to rotate the spindle 104 through interactions with the magnets 108 fixedly connected to the rotor body 110 at a rate in the range of approximately 3000 to 6000 rotations per minute (rpm), for example, the spindle 104 may be driven to rotate at a rate of approximately 4500 rpm. Meanwhile, the food product can be fed into the food cutter assembly 100 (e.g., through the cutting tool 106) via one or more supply tubes, where the food product is transported through the tubes by flowing water. In some embodiments, the water flow rate through the one or more supply tubes is in the range of approximately 400 to 700 gallons per minute, or any flow rate sufficient for driving the food product through the one or more supply tubes at a sufficient speed for the food cutter assembly 100 to process the food product. The one or more supply tubes can include a perforated tube that directs the food product into the food cutter assembly 100. In some embodiments, the perforated tube may include a tapered portion that aligns the food product with the cutting tool 106 of the food cutter assembly 100. A portion of the water used to transport the food product may be shed through openings in the perforated tube through a bypass tube drained out of the system prior to interaction with the cutting tool 106, while some of the water may enter the interior passage of the rotor body 110 (e.g., into tube 130) through the cutting tool 106.

Water (or another food-safe fluid) can be pumped through the fluid passages 124 and 126 to create a water film between the housing 102 and the rotor body 110, where the water film serves to reduce friction between the housing 102 and the rotor body 110 while the spindle 104 is being rotated through interaction between the magnets 108 and the stator 112 and/or the pulley 408. For example, arrows in FIG. 3 illustrate example water flow through fluid passages 124 and 126, where water can be directed into the gap 128 between the rotor body 110 and the tube 130. In some embodiments, fresh water can be supplied for the fluid passages 124 and 126 from a water source (e.g., a city water tap). Water for the fluid passages 124 and 126 may be suppled from the water source at a water pressure in the range of approximately 40 psi to 80 psi, for example the water may be supplied at approximately 60 psi. In some cases, keeping the water pressure above approximately 40 psi may avoid bacteria or mold build up within the food cutter assembly 100. Using water as a lubricant for the food cutter assembly 100 can reduce the risk of contaminating or otherwise negatively impacting the food product during its processing. For example, food safe oils can be used to lubricate processing components of general food processing equipment, however, these oils can seep into food product processing streams and contact the processed food products. While food safe oils are generally not toxic, if the oils are combined with the processed food, the oils can still impart undesirable organoleptic traits to the processed food. The food cutter assembly 100 described herein can be lubricated with water that is pumped through the fluid passages 124 and 126, thus the seepage of lubricant (i.e., the water) into the food product processing stream has no negative impact on the food product, which is already being driven through the food product processing path by water. Additionally, since the food cutter assembly 100 does not include interior mechanical seals to separate the rotor body 110 from an exterior drive system operating directly on the rotor body 110 (e.g., due to the magnetic/electromagnetic interaction between the magnets 108 and the stator 112 (e.g., as shown in FIGS. 1-3) or between externally-driven magnets 404 housed in the pulley mount 400 and the magnets 108 (as shown in FIGS. 4-8)), leakage of the lubricant within and without the food cutter assembly 100 is reduced. Preventing leakage of the food cutter assembly 100 external to the food cutter assembly 100 can prevent starchy fluid from be deposited around the food cutter assembly 100, which in turn prevents waste of a useful byproduct of the food process as well as avoids potentially hazardous slip conditions.

In some embodiments, the separation (or play) between the rotor body 110 and the tube 130 (e.g., the gap 128) can be in the range of 5 to 30 one thousandths of an inch (0.005 to 0.030 in.), for example the rotor body 110 and the tube 130 can have a separation tolerance of approximately 10 to 15 one thousandths of an inch (0.010 to 0.015 in.). In some embodiments, the separation (or play) at the opening at a first end, where water can enter the space between the rotor body 110 and the tube 130 adjacent the flange, may be in the range of 10 to 30 one thousandths of an inch (0.010 to 0.030 in.), for example the play between ends of the rotor body 110 and the tube 130 that form the opening may approximately 15 one thousandths of an inch (0.015 in.). In some embodiments, the rotor body 110 and the tube 130 can also have an opening at a second end (e.g., proximate to the cutting tool 106) that allows water to exit from between the rotor body 110 and the tube 130 and enter the tube 130. The water can serve to reduce friction between the rotor body 110 and the tube 130, and the water can also serve to clean out the gap 128 between the rotor body 110 and the tube 130 and/or the inner surface of the tube 130. For instance, the water can flush particulates, such as starch, remaining from the food product after passing through the cutting tool 106.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A food cutter assembly comprising:
    a spindle body defining an interior passage for receiving a cut food product, the interior passage extending along a rotational axis of the spindle body;
    a cutting tool connected to an end of the spindle body for cutting the food product, the interior passage positioned adjacent the cutting tool to receive the cut food product from the cutting tool;
    a magnet coupled to the spindle body, the magnet positioned external to sealed fluid-containing areas of the food cutter assembly;
    a housing for rotationally mounting the spindle body; and
    a drive system coupled to the housing remote from the magnet, the drive system configured to rotate the magnet about the rotational axis without physical contact with the magnet and the spindle body.

2. The food cutter assembly as recited in claim 1, wherein the drive system includes a pulley mount, the pulley mount comprising:
    a pulley having one or more magnets mounted to an interior surface of the pulley and having an exterior surface configured to be driven by a belt; and
    a stationary shaft coupled to the housing, the stationary shaft having a structural portion positioned between the magnet coupled to the spindle body and the one or more magnets mounted to the interior surface of the pulley, the one or more magnets configured to be rotated about the stationary shaft when the pulley is driven by the belt.

3. The food cutter assembly as recited in claim 2, wherein the stationary shaft includes a first flange and a second flange, and wherein the one or more magnets are disposed between the first flange and the second flange during rotation about the stationary shaft.

4. The food cutter assembly as recited in claim 3, wherein the pulley mount includes at least one bearing positioned between the stationary shaft and the interior surface of the pulley, and wherein the interior surface of the pulley contacts the at least one bearing for rotation about the stationary shaft.

5. The food cutter assembly as recited in claim 3, wherein the pulley mount includes a first bearing abutting the first flange and a second bearing abutting the second flange, and wherein the interior surface of the pulley contacts the first bearing and the second bearing for rotation about the stationary shaft.

6. The food cutter assembly as recited in claim 1, further comprising a first thrust disc fixedly connected to the spindle body.

7. The food cutter assembly as recited in claim 6, further comprising a second thrust disc fixedly connected to the spindle body.

8. The food cutter assembly as recited in claim 7, wherein the magnet is fixedly connected to the spindle body between the first thrust disc and the second thrust disc.

9. The food cutter assembly as recited in claim 1, further comprising additional magnets coupled to the spindle body, the magnet and the additional magnets extending radially from the rotational axis of the spindle body.

10. The food cutter assembly as recited in claim 1, wherein the drive system includes a stator with a variable frequency drive operably coupled to the stator to control a rate of rotation of the spindle body about the rotational axis.

11. The food cutter assembly as recited in claim 1, wherein the housing includes a first radial bearing and a second radial bearing, the first radial bearing to be positioned proximate to a first thrust disc when the spindle body is rotationally mounted to the housing, and the second radial bearing to be positioned proximate to a second thrust disc when the spindle body is rotationally mounted to the housing.

12. The food cutter assembly of claim 11, further comprising fluid passages, wherein the fluid passages of the food cutter assembly comprise first fluid passages and second fluid passages, the spindle body and the housing defining the first fluid passages to extend from a first port in the housing through the first radial bearing to the spindle body, and the spindle body and the housing defining the second fluid passages to extend from a second port in the housing through the second radial bearing to the spindle body.

13. The food cutter assembly as recited in claim 1, wherein the cutting tool comprises a helical knife.

14. A food cutter assembly comprising:
a spindle body defining an interior passage for receiving a cut food product, the interior passage extending along a rotational axis of the spindle body;
a first thrust disc fixedly connected to the spindle body;
a second thrust disc fixedly connected to the spindle body;
a cutting tool connected to an end of the spindle body for cutting the food product, the interior passage positioned adjacent the cutting tool to receive the cut food product from the cutting tool;
a magnet fixedly connected to the spindle body between the first thrust disc and the second thrust disc, the magnet positioned external to sealed fluid-containing areas of the food cutter assembly;
a housing for rotationally mounting the spindle body, the housing including a first radial bearing to be positioned proximate to the first thrust disc and a second radial bearing to be positioned proximate to the second thrust disc when the spindle body is rotationally mounted to the housing, wherein the spindle body and the housing define first fluid passages extending from a first port in the housing through the first radial bearing to the spindle body, and second fluid passages extending from a second port in the housing through the second radial bearing to the spindle body; and
a pulley mount coupled to the housing remote from the magnet, the pulley mount including:
at least one magnet magnetically coupled with the magnet fixedly coupled to the spindle body, the pulley mount configured to rotate the magnet about the rotational axis without physical contact with the magnet or the spindle body; and
a stationary shaft coupled to the housing, the stationary shaft having a structural portion positioned between the magnet coupled to the spindle body and the at least one magnet magnetically coupled with the magnet fixedly connected to the spindle body.

15. The food cutter assembly as recited in claim 14, wherein the pulley mount further includes:
a pulley having the at least one magnet mounted to an interior surface of the pulley and having an exterior surface configured to be driven by a belt,
wherein the at least one magnet is configured to be rotated about the stationary shaft when the pulley is driven by the belt.

16. The food cutter assembly as recited in claim 14, wherein the at least one magnet is separated from the structural portion of the stationary shaft by a gap to prevent contact between the at least one magnet and the stationary shaft.

17. The food cutter assembly as recited in claim 16, wherein the stationary shaft includes a first flange and a second flange, and wherein the at least one magnet is disposed between the first flange and the second flange during rotation about the stationary shaft.

18. The food cutter assembly as recited in claim 17, wherein the pulley mount further includes at least one bearing positioned between the stationary shaft and the interior surface of the pulley, and wherein the interior surface of the pulley contacts the at least one bearing for rotation about the stationary shaft.

19. The food cutter assembly as recited in claim 17, wherein the pulley mount further includes a first bearing abutting the first flange and a second bearing abutting the second flange, and wherein the interior surface of the pulley contacts the first bearing and the second bearing for rotation about the stationary shaft.

20. The food cutter assembly as recited in claim 15, wherein the exterior surface of the pulley includes a sprocket.

* * * * *